July 27, 1948.
J. L. EDELEN
2,445,943
CONDITION RESPONSIVE MOUNTING FOR
MEASURING INSTRUMENTS
Filed Jan. 1, 1944
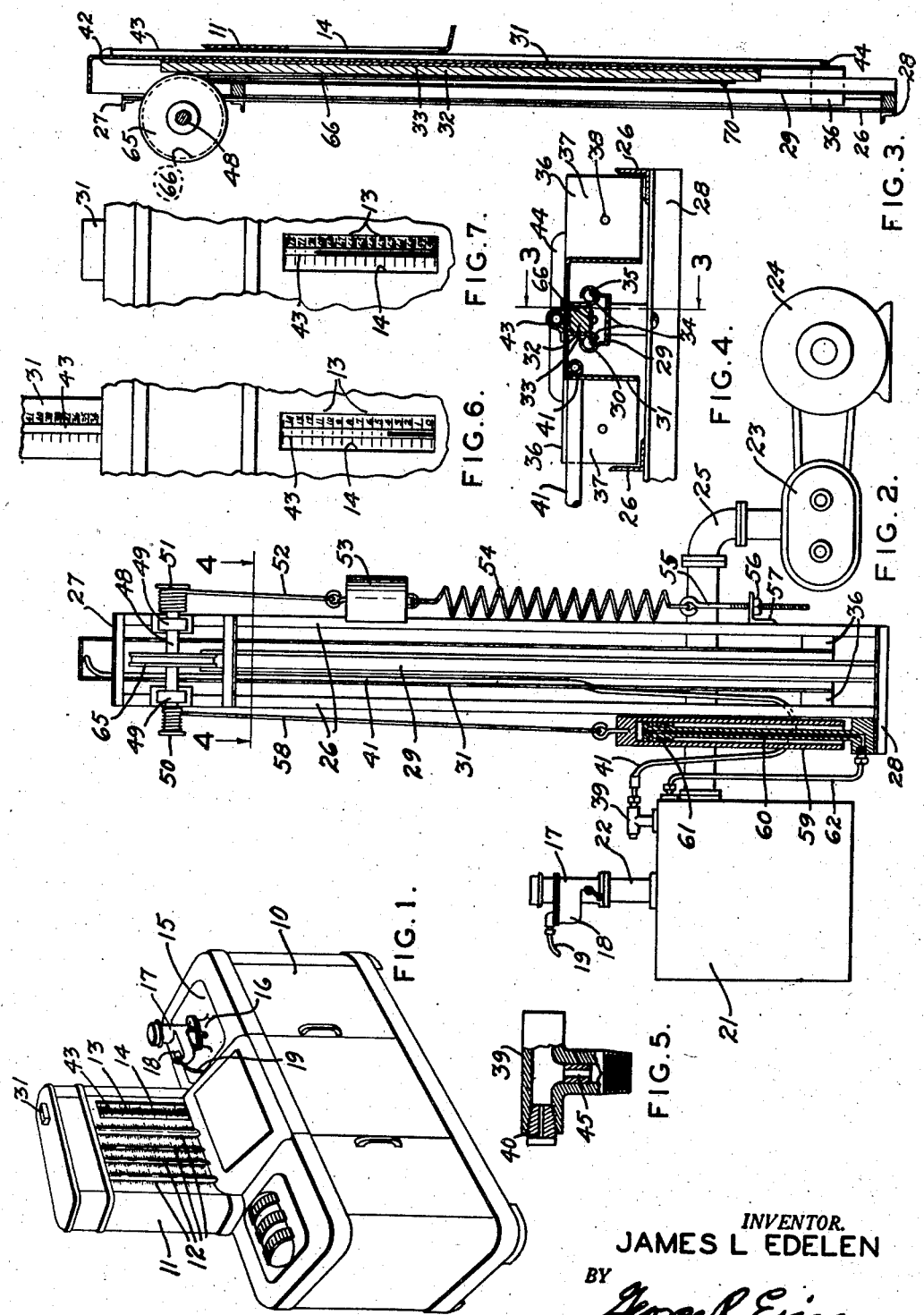
INVENTOR.
JAMES L EDELEN
BY
George R. Ericson
ATTORNEY Patented July 27, 1948

2,445,943

UNITED STATES PATENT OFFICE 2,445,943

CONDITION RESPONSIVE MOUNTING FOR MEASURING INSTRUMENTS

James L. Edelen, Kirkwood, Mo., assignor to Carter Carburetor Corporation, St. Louis, Mo., a corporation of Delaware Application January 1, 1944, Serial No. 516,688

6 Claims. (Cl. 73—118)

This invention relates to measuring devices of the type having relatively large scales over which the indicating element travels, and consists particularly in novel means for automatically positioning the indicating parts relative to a support to facilitate observation by the operator.

The invention may be used advantageously in a flow machine for testing the delivery of fuel to internal combustion engine carburetors. Such a machine may be used to compare the rates of fuel flow through standard and test carburetors under similar conditions of applied suction and throttle position. I obtain a very accurate measurement of suction posterior to the carburetor throttle by the use of a water manometer. Although the range of suction need not vary as widely as engine suction in actual operation, for satisfactory results I find that a variation in the water column of several feet is desirable for a sufficiently sensitive suction reading. The suction thus read is, of course, the difference in pressure between atmosphere and a point posterior to the carburetor throttle. Such a range of manometer variation would make reading thereof by the operator difficult.

Accordingly, it is an object of the present invention to provide a measuring device including means for bodily moving the device relative to the operator so as to maintain the indicating element at a convenient observation point.

A more detailed object is to provide a motor for moving a manometer or other meter relative to its support, which motor is responsive to the changes in the forces or other factors being measured so that the indicating element will remain within a fixed observation area.

These objects and other more detailed objects hereafter appearing are attained by the structure illustrated in the accompanying drawing in which Fig. 1 is a perspective view of a carburetor flow meter embodying the invention.

Fig. 2 is an enlarged view of the automatically adjustable manometer and associated mechanism, parts being sectioned and others being omitted for clearer illustration.

Fig. 3 is a central vertical section through the structure in Fig. 2.

Fig. 4 is a horizontal section on line 4—4 of Fig. 2.

Fig. 5 is a view of a detail of the structure in Fig. 2.

Figs. 6 and 7 are front views of the observation window showing the manometer in different positions.

The flow meter apparatus shown in Fig. 1 is constructed to measure the rate of fuel flow through the carburetor so as to indicate whether the carburetor is functioning properly or not. The apparatus comprises a base 10, having an upright frame 11 mounting various measuring scales 12 for indicating the rate of fuel supply, and a water manometer, generally indicated at 13, mounted adjacent an observation window 14. Scales 12 are located approximately at the eye level of an operator standing before base 10, whereas scale 13, in the position of Figs. 1 and 2, extends substantially below this level. At one side of the base there is provided a metal pan 15 at the center of which there is an ornamental stand 16 for mounting a carburetor 17. Fuel is supplied to the carburetor constant level bowl 18 through flexible tubing 19 connected with the gauges 12 and a fuel pump (not shown). The detailed construction of the fuel gauges and pump does not constitute the present invention and will not be described further.

Figs. 2 and 3 show the manometer, or differential fluid pressure meter, and the means to produce suction to draw air and fuel through the carburetor. The box 21, located within the right hand portion of base 10 in Fig. 1, has an upright tube 22, which extends into stand 16, for mounting carburetor 17 to which is connected the flexible fuel line 19, as in Fig. 1. Suction pump 23, operated by motor 24, is connected to box 21 by a large pipe 25 so as to evacuate air from the box and induce a flow of air and fuel through the carburetor. Adjacent the box there are provided a pair of upright angle bars 26 connected at the top and bottom by bars 27 and 28 to form a rigid guide frame. Between these bars, there is a third stationary upright 29 of generally U-section, but with the extremities of its legs curved, as at 30 to form bearing races. The manometer carrier comprises, generally, the U-section member 31 extending between angles 26 and carries a central post 32 provided with metal sheathing 33 having curved extensions 34 cooperating with complementary curved elements 30 to receive bearing balls 35 held in position by grease packing or other means. At the lower end of the carrier are a pair of wells 36 for the manometer liquid, conveniently water, the wells having top plates 37 with openings 38 so that atmospheric pressure is applied to the surface of the liquid.

Also projecting from box 21 is a T-fitting 39 having an air bleed opening 40 and connected to a flexible tube 41 which extends between framing uprights 26 and upwardly along manometer carrier 31, then through the carrier, as to 42, where it connects with a glass tube 43 which extends downwardly along the front of the carrier and across observation window 14. The T-fitting opens into the box through a restriction 45. The front part of carrier 31 is provided with manometer scale markings, as shown in Figs. 6 and 7.

Tube 43, at its lower extremity, extends laterally, as at 44 in both directions and opens into atmospheric wells 36 which are, originally, substantially filled with water. Thus, when the pressure in box 21 is reduced below atmospheric, water will rise in tube 43 along the manometer scale markings so as to accurately indicate the reduction of pressure in the box below atmospheric.

A cross shaft 48 has bearings 49 secured to the upper portions of uprights 26 and has drums 50 and 51 at the extremities thereof. A cord 52 wound about drum 51 carries a weight 53 which, in turn, is connected by a coiled spring 54 to an adjusting bolt 55 and nut 56 seated against the under surface of a bracket 57 projecting from the right hand standard 26. A second cord 58 wound about drum 50 is secured at its lower extremity to a cylinder 59 slidable upon a fixed, hollow stem 60, a fluidtight seal being provided at 61. Stem 60 connects at its lower extremity with a tube 62 which opens into box 21. Thus cylinder 59 and stem 60 form a suction or differential fluid motor responsive to a lowering of the pressure in box 21 to draw cylinder 59 downwardly, rotating shaft 48 against the resistance of weight 53 and spring 54.

A pulley 65, rigid with shaft 48, has wound thereupon a flexible strap or cord 66 which extends downwardly along central post 32 of the manometer carrier and is secured to the lower extremity thereof, as at 70. Clockwise rotation of pulley 65, under the influence of suction applied to cylinder 59, as the motive force, automatically lowers the manometer or meter carrier and manometer bodily so as to bring different parts of scale 13 behind observation window 14, and maintain the top of the water column within easy range of the operator's vision.

Fig. 6 shows the manometer moved to its uppermost position by weight 53 and spring 54, as when there is no reduction of pressure in box 21 below atmospheric, and Fig. 7 shows the manometer lowered, as when relatively high suction exists in box 21, so that in both cases, the top of the water column is readily observable through observation window 14.

Weight 53 may be adjustable and should substantially balance the weight of the manometer carrier, including wells 36 and the supply of water therein. Spring 54 balances the effect of suction on cylinder 59 so that a graduated action is obtained.

Because of air bleed 40 and restriction 45 in T fitting 39, the suction in box 21 is substantially reduced in application to the manometer so that the necessary length of the manometer is reduced. The small bleed, however, does not substantially affect the suction applied to the carburetor through the large suction pipe 25. The movement of the manometer is thus proportional to changes in suction, as measured by the manometer.

The principles of the invention, obviously, may be utilized in other types of measuring devices where it is desirable to maintain the indicating means or elements approximately in a certain position. The invention, as illustrated, may be modified in various respects as will occur to those skilled in the art and the exclusive use of all modifications as come within the scope of the appended claims is contemplated.

I claim:

1. A measuring device comprising a support having an observation window, a scale element and an indicating element movable relative to said scale element for measuring a value, means mounting said elements adjacent said window for movement in unison relative to said support past said window, and differential pressure producing means for moving said mounting means in accordance with the value being measured but oppositely from the corresponding movement of said indicating element relative to said support so as to maintain said indicating element readily observable through said window.

2. A device for measuring differential pressures comprising a support having an observation window, a manometer movably mounted adjacent said window, and a motor responsive to the pressure differential being measured to bodily move said manometer and automatically maintain its indicating means clearly observable through said window.

3. A device for measuring differential fluid pressures comprising a support frame having an observation window, a carrier movably mounted on said frame, a manometer mounted on said carrier and extending adjacent and beyond said window, and a fluid motor operated by the fluid pressure being measured and connected to said carrier so as to maintain the pressure indicating means of said manometer clearly observable through said window.

4. A device as specified in claim 3 further including means yieldingly urging said carrier in one direction against said fluid motor and adjustable to insure proper positioning of the manometer indicating means.

5. A device for testing carburetors comprising a carburetor mounting stand, suction producing means for drawing air and fuel through the carburetor, a manometer movably mounted on said stand and arranged for measuring suction applied to the posterior end of the carburetor, said manometer having an extended scale, and a suction motor responsive to changes in said applied suction for shifting said manometer bodily relative to said stand so as to maintain the manometer indicator within a predetermined area to facilitate observation thereof.

6. A device as described in claim 5 in which said manometer is mounted so as to be extendable substantially beyond the structural limits of said stand.

JAMES L. EDELEN.

REFERENCES CITED

The following references are of record in the file of this patent:

UNITED STATES PATENTS

| Number | Name | Date |
| --- | --- | --- |
| 1,230,035 | Royston | June 12, 1917 |
| 1,468,383 | Guy | Sept. 18, 1923 |
| 1,949,908 | Hawk | Mar. 6, 1934 |
| 2,019,886 | Bogoslowsky | Nov. 5, 1935 |
| 2,088,385 | Podbielniak | July 27, 1937 |
| 2,091,303 | Brelsford | Aug. 31, 1937 |
| 2,112,704 | Mackay | Mar. 29, 1938 |
| 2,113,436 | Williams | Apr. 5, 1938 |
| 2,144,404 | Eden | Jan. 17, 1939 |
| 2,156,877 | Simpson et al. | May 2, 1939 |
| 2,163,873 | Gibbons | June 27, 1939 |
| 2,185,205 | Linebarger | Jan. 2, 1940 |
| 2,212,586 | Chuy | Aug. 27, 1940 |
| 2,243,456 | Dutter | May 27, 1941 |

FOREIGN PATENTS

| Number | Country | Date |
| --- | --- | --- |
| 632,387 | Germany | July 7, 1936 |